Aug. 7, 1945.  J. D. RUSSELL  2,381,519
FLIGHT AND LINK CONNECTOR
Filed July 28, 1942

INVENTOR.
John D. Russell.
BY Harold W. Hawkins
ATTORNEY.

Patented Aug. 7, 1945

2,381,519

UNITED STATES PATENT OFFICE 2,381,519

FLIGHT AND LINK CONNECTOR

John D. Russell, Cranberry Township, Venango County, Pa., assignor to Joy Manufacturing Company, a corporation of Pennsylvania Application July 28, 1942, Serial No. 452,653

6 Claims. (Cl. 198—176)

This invention relates to new and useful improvements in chain conveyors and in particular to improvements in the flights and their connections to the chain.

My invention has for an object the provision of a quickly detachable flight and link construction which will permit the flight to turn in one direction and follow the contour of the conveyor surface while preventing the flight from turning in the opposite direction or away from the surface over which the chain is adapted to travel.

Another object is to provide a detachable flight for a chain conveyor having a connector adapted to straddle the chain which is provided with outwardly projecting lugs for receiving and connecting the flights thereto.

Another object is to provide a flight having a forked end for straddling the lug on a connector for the chain and having one surface of the legs beveled to permit the flight to turn readily in one direction while the engagement of the legs with the connector prevents turning in the opposite direction.

A further object is to provide a flight and link construction for a chain conveyor adapted to operate over flat and sloping surfaces forming the pan of the conveyor.

A still further object is to provide a flight and link construction for a chain conveyor having a pin composed of contiguous sections some of which are flat and others of which slope angularly from the chain, which is so constructed that the flights will engage all sections of the pan regardless of whether the section is flat or sloping.

These and other objects which will hereinafter be made apparent to those skilled in this particular art, are accomplished by means of this invention, one embodiment of which is described in the following specification and illustrated in the accompanying drawing wherein.

Figure 1:
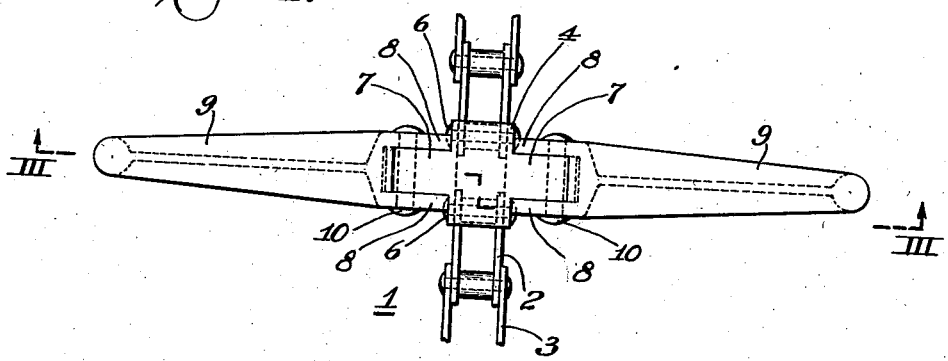
Fig. 1 is a plan view of a flight and link connector for a chain conveyor made in accordance with my present invention.
Figure 2:
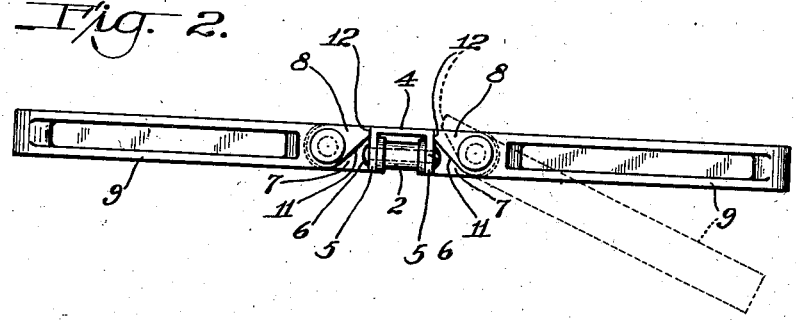
Fig. 2 is a view in end elevation of my improved flight and link connection.
Figure 3:
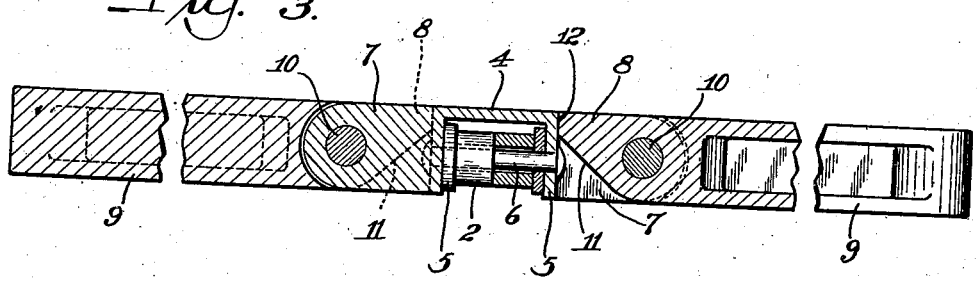
Fig. 3 is a section taken on line III—III of Fig. 1.

In the drawing, in which like numbers of references designate like parts in all the figures, 1 represents a conventional roller link chain composed of a series of block link sections 2 connected together by side straps 3.

In practicing my invention, the straps 3 at regularly spaced intervals throughout the length of the chain 1 are replaced with a connector link 4 having a central inverted channel shaped section 5 which is adapted to straddle the ends of adjacent roller block links 2. Pins 6 extend through the legs of the channel section 5 and secure the ends of adjacent links 2 to the connector link 4.

Projecting outwardly from each side of the channel section 5 of the link 4 is a lug 7 which extends between the legs 8 of a bifurcated flight 9. The legs 8 of the flight 9 are pivotally secured to the lug 7 by a pin 10 which extends through registering openings in the legs 8 and the lug 7 and are arranged to be parallel to the channel section 5 of the connector link 4.

The undersides of the legs 8 of each flight are beveled or undercut as at 11 to provide a relatively small end 12 on each leg of the flight adjacent the upper surface thereof which is adapted to abut against or engage that portion of the outer surface of the channel section 5 located above the pin 10.

From this construction it is apparent that since the legs 8 only engage the connector link 4 at a point above the pin 10, the flight 9 is free to turn from a horizontal position to a downwardly sloping position from the connector link 4 but cannot extend upwardly above such plane since the surfaces 12 on the legs 8 engage the sides of the channel 5 and prevent upwardly turning movement of the flight. Thus the connection between the flight and the chain will permit the flight to drop downwardly and follow the contour of the surface of the conveyor over which the chain is adapted to pass but cannot raise above that surface or move out of contact with the conveyor pan.

It is also apparent from the foregoing description that my improved flight and connector link permits conveyor pans to be used which slope downwardly from the run of the chain thereby increasing the material handling capacity of the conveyor and since the flights are prevented from turning above a horizontal plane, the raising of the flights from engagement with the conveyor pan as they pass from a downwardly sloped portion to a horizontal portion contiguous therewith is prevented.

What I claim as new and desire to secure by Letters Patent is:

1. In a chain conveyor, the combination comprising a chain and flights projecting outwardly from the opposite side of said chain, each of said flights having a bifurcated end to provide legs for attaching said flight to said chain, and means for pivotally connecting said legs to said chain, each of said legs having its bottom edge thereof cut away to provide a relatively narrow end for abutting against said chain above said pivot, whereby said flight is free to slope downwardly from said chain but movement thereof above a horizontal plane is prevented.

2. In a chain conveyor, the combination comprising a block link chain, a connector link for joining the ends of adjacent block links of said chain, and a flight pivotally connected to each side of said connector link and projecting outwardly therefrom, each of said flights having a bifurcated end providing legs for connecting the flight to said connector link, the legs on said flights projecting beyond said pivot toward said chain and having their under edges cut away to provide an inner end of substantially reduced thickness adapted to engage said connector link above the pivot, whereby turning movement of said flight in an upward direction is prevented, while turning movement thereof in a downward direction is readily permitted.

3. In a chain conveyor, the combination comprising a connector link, having a channel section, pivotally connecting the ends of adjacent links of the chain, a lug projecting outwardly from each side of said channel section, and a flight pivoted to each of said lugs and abutting against the side of said channel section, each of said flights having a beveled corner on its inner end to permit turning movement thereof in one direction.

4. In a chain conveyor, the combination comprising a connector link, having a central channel section pivotally connecting the ends of adjacent links, and flights pivotally connected to said connector links and extended at right angles to said channel section and the chain links connected thereby, each of said flights having the upper corner of its inner end abutting against said channel and its bottom corner beveled to permit downward turning movement thereof.

5. In a chain conveyor, the combination comprising a connector link, having a central channel section pivotally connecting the ends of adjacent links and a flight pivotally connected to each side of said connector link and abutting against the side of said channel section, each of said flights having a beveled corner on its inner end to permit turning movement thereof in one direction.

6. In a chain conveyor, the combination with a block link chain, comprising a connector having a channel section for receiving the ends of adjacent block links and to which said links are pivoted, a lug projecting outwardly from each side of said connector and a flight pivotally connected to each of said lugs, each of said flights having a bifurcated end, providing legs adapted to straddle its respective lug, said lugs having the upper corners on the inner ends abutting against the sides of said connector, and a beveled bottom corner to permit downward turning movement of said flights.

JOHN D. RUSSELL.